United States Patent Office 3,825,655
Patented July 23, 1974

3,825,655
PRODUCTION OF HYDROGEN FLUORIDE
AND METAL SULFATES
Eduard Eipeltauer, Ma-Enzersdorf-Suedstadt, and Hans-Dietrich Lauss, Thenning, Austria, and Bernhard Spreckelmeyer, Leverkusen, Germany, assignors to Bayer Aktiengesellschaft, Leverkusen, Germany
Filed July 14, 1972, Ser. No. 271,895
Claims priority, application Germany, July 29, 1971, P 21 38 015.4
Int. Cl. C01b 7/22; C01f 11/46
U.S. Cl. 423—485                                   13 Claims

ABSTRACT OF THE DISCLOSURE

In the production of hydrogen fluoride and a metal sulfate by the reaction of a metal fluoride with sulfuric acid in an aqueous suspension at an elevated temperature up to about 350° C., the improvement which comprises
(a) in a first stage contacting the metal fluoride with about 1.2 to 11 times the stoichiometric amount of about 20 to 100% sulfuric acid at an elevated temperature up to about 300° C., and separating hydrogen fluoride formed, and
(b) passing the reaction mass to a second stage, separating the liquid phase in said second stage, and recycling the liquid to said first stage. Advantageously the reaction is completed in a third stage at 50 to 350° C. carried out on the solid residue from the second stage, liquid from the second stage being recycled to the first stage. To supply some of the heat of reaction, the sulfuric acid may be formed in situ from sulfur trioxide and/or oxides or hydroxides of alkali or alkaline earth metals may be added. Such additives, or others such as potassium or iron sulfate, will also affect the grain size and shape of the metal sulfate produced by the primary reaction. When the metal fluoride is calcium fluoride, the extent of hydration of the calcium sulfate product can be predetermined by following the reaction conditions set out in FIG. 1.

---

This invention relates to a process for the production of hydrogen fluoride and metal sulfates by the reaction of metal fluorides, in particular calcium fluoride, with an excess of sulfuric acid.

On a commercial scale hydrogen fluoride is produced by the reaction of concentrated sulfuric acid with fluorspar in an externally heated reaction vessel, for example in a revolving tubular furnace or in a stationary retort which is equipped with a stirring mechanism. To achieve this the fluoride is, for example, mixed initially with a substantially stoichiometric quantity of concentrated sulfuric acid in the mixer either at room temperature or at an elevated temperature. The mixture quickly thickens to a paste-like consistency as a result of the partial reaction which occurs between the fluoride and the sulfuric acid. The resulting product is then introduced into a suitable reaction vessel and the reaction completed in this at a temperature of up to 250° C.

Unfortunately, this procedure presents considerable difficulties. Firstly, it is not easy to mix fluorspar and sulfuric acid homogeneously in an equimolar ratio and this causes the reaction to remain incomplete and the yield to be reduced. In addition, the paste-like preliminary reaction product tends to cake on the hot walls of the reaction furnace and causes blockages. This causes heat transfer to be seriously impaired and the endothermic reaction thus proceeds at a slower rate. In addition, the process as a whole is extremely difficult to control because it is extremely difficult to follow the progress of the reaction of the solids in the reactor. This frequently causes poor yields, over heating of the reaction furnaces and, hence, rapid wear of the units. The anhydrite which is obtained as the secondary product is of fluctuating quality because of the irregular nature of the reaction and is not suited for many applications.

It is also known that the reaction of fluorspar with sulfuric acid can be carried out in the presence of an organic diluent, such as trichlorobenzene (cf. e.g. U.S. Patent Specification No. 2,846,290). Although the difficulties which attend the mixing of the reactants are overcome in such cases, the use of the organic solvent also has considerable disadvantages. The calcium sulfate which is formed during the reaction accumulates in an extremely fine-grained form with the result that substantially insurmountable difficulties are encountered in separating the deposited material. The deposited material also retains a considerable quantity of solvent and considerable solvent losses must therefore be accepted. In addition, the calcium sulfated formed can only be used after it has been suitably worked up.

It is accordingly an object of the present invention to provide a simple, efficient process for reacting metal fluorides with sulfuric acid to produce metal sulfates in easily recoverable, useful physical form.

These and other objects and advantages are realized in accordance with the present invention pursuant to which a metal fluoride is reacted with sulfuric acid in an aqueous suspension at an elevated temperature up to about 350° C. The reaction is effected in stages, the first stage employing sulfuric acid of about 20 to 100% concentration present in an 0.2 to 10-fold excess, i.e. present in about 1.2 to 11 times the stoichiometric amount, and an elevated temperature up to about 300° C. The hydrogen fluoride formed is separated and the reaction mass is passed to a second stage wherein the liquid phase is separated from the solids and the liquid is recycled to the first stage. Preferably, the solid residue passes to a third stage wherein it is further heated at a temperature of about 50 to 350° C. to complete the reaction.

Surprisingly, it has been found that most of the disadvantages referred to hereinabove can be obviated in this way. The addition of excess sulfuric acid enables the reaction components to react smoothly and quickly with one another.

A further advantage of the process according to the invention is that the form in which the metal sulfate crystallizes can be influenced by suitable selection of the reaction conditions, especially the reaction temperature and the water content of the sulfuric acid. In the process according to the invention, these metal sulfates accumulate in highly pure form and can thus be used economically. For example when calcium fluoride is used as the starting fluoride, it is possible to obtain anhydrite, the dihydrate of calcium sulfate or the semi-hydrate of calcium sulfate by suitable selection of the reaction conditions. The reaction conditions which are required for the formation of these individual modifications of calcium sulfate can be taken from the accompanying graph (FIG. 1).

In this diagram the formation of various forms of calciumsulfate in sulfuric acid of various concentrations and at various temperatures is described.

The full line is the boiling-point-curve,
ordinate: temperature in ° C.
abscissa: sulfuric acid in percent concentration (I) $CaSO_4 \cdot 2H_2O$
(II) $CaSO_4 \cdot \frac{1}{2}H_2O$
(III) $CaSO_4$ In one advantageous embodiment of the process according to the invention, it is possible to carry out the first stage of the process in two or more component or sub-stages, in which case differences in concentration of sulfuric acid and/or temperature are maintained between the individual component stages. In this way, it is possible to obtain a very coarse-grained deposition of the sulfate which can be separated readily in the second stage of the process, only a little of the liquid phase adhering to it.

The process according to the invention may be carried out with any fluoride-containing starting materials. Naturally occurring metal fluorides, preferably fluorspar (calcium fluoride) prepared in a known way, for example by flotation, are normally used. The process according to the invention can, however, be used with equal effect for other fluorides, for example precipitated calcium fluoride, or for complex fluorides, for example sodium silico fluorides.

The starting materials, i.e. the crude fluorides, should be as fine-grained as possible to ensure that the reaction proceeds quickly and that the installation can be employed to capacity by use of large throughputs. Fluorides with a maximal grain size of from about 40 to 300 microns, preferably less than about 200 microns, are generally used.

In one simple embodiment of the process according to the invention, the starting materials are delivered together with recycled sulfuric acid to a reaction vessel in which they are thoroughly mixed. The reaction of the metal fluoride with the sulfuric acid in this reaction vessel is either complete or partial. The reaction conditions are so adjusted that all the hydrogen fluoride is formed in the first stage in vapor form. The HF-containing vapor which escapes from the reaction vessel contains quantities of $H_2O$, which depend upon the concentration of the sulfuric acid used, and small quantities of sulfuric acid but is free from dust. Anhydrous hydrogen fluoride is obtained from a subsequent separator, while sulfuric acid which is used for washing absorbs the water. The anhydrous hydrogen fluoride is run off and can be further processed in a known manner. It is also possible, however, to separate the HF-containing vapor from the process, optionally after a suitable treatment, and to work this up into anhydrous HF and aqueous HF by condensation and distillation.

Instead of using a single reaction vessel, it is possible, as mentioned above, to use a series of reaction vessels—cascade—and in such a case differences can be maintained between the temperatures and/or concentrations of the individual vessel. Finally, as much as possible of the deposited metal sulfate is removed from the reaction vessel by means of suitable apparatus, such as a filtration apparatus or a centrifuge, optionally washed with water or dilute sulfuric acid and discharged. Depending upon the degree to which the reaction has proceeded, the solid phase may be subjected to a further heat treatment to complete the reaction. In principle, the optional third stage of the reaction may be carried out in any reactor which is suitable for the separation of volatile liquids from a solid. This after-treatment can be carried out in a known way in a revolving tubular furnace or barrel-type furnace and the sulfate subsequently discharged in dry form, the hydrogen fluoride which remains being volatized and driven off. It is also possible, however, to carry out the third stage in a fluidized bed reactor, kneader or even a turbulator of the kind described, for example, in "Chemie, Anlagen und Verfahrenstechnik" (1971), page 44, or a similar apparatus. The liquid phase which is obtained in the second stage consists mainly of water, sulfuric acid and hydrogen fluoride and may also contain more or less solid metal sulfate and effective additives. This liquid phase is recycled to stage one optionally after the removal of hydrogen fluoride from it.

In a preferred embodiment of the process according to the invention, the starting materials may be preheated in any way. The sulfuric acid may be heated to temperatures of about 50° C. up to about 300° C. and the metal fluoride to temperatures of around 800° C. Apparatus suitable for such preheating is described, for example, in German Offenlegungsschrift Nos. 1,442,766 and 1,442,782. In addition to supplying energy, preheating has the further advantage that troublesome flotation agents can be removed. These otherwise impede the reaction of the fluorspar with the sulfuric acid and adversely affect the quality of the metal sulfates, for example anhydrite, formed. Depending upon the degree of impurity, the metal fluorides are superheated until all the substances which are formed in the break down of the flotation agent or the agents themselves for example saturated and unsaturated fatty acids, have been removed. Sulfidic sulfur which is present in the starting materials, for example in crude fluorspar, is also removed in this way. Temperatures in excess of about 400° C. are generally required to destroy these organic or inorganic substances. However, if preheating is carried out at temperatures in excess of about 800° C., there is a danger of undesirable caking.

It has been found that, when fluorspar is used, the reaction velocity is higher, the more concentrated is the sulfuric acid in the reaction solution. A high concentration of sulfuric acid is also desirable in order to obtain as high as possible a concentration of hydrogen fluoride in the vapor phase. The grain size of the sulfate deposit formed and hence its filterability are, however, reduced to the same extent. Accordingly, the reaction conditions have to be coordinated in order to achieve optimum results. It is preferred to use in the first stage sulfuric acid concentrations of from about 50 to 85%, an excess of from about 100 to 300% and temperatures of from about 80 to 100° C. The filterability of the deposited materials and their other properties can further be influenced by additional measures. One method of achieving this is, for example, to return some of the metal sulfate to the reaction vessel as seed crystals. Another method of obtaining readily filterable deposits which crystallize in a particular form is to add inorganic or organic crystal-habit modifiers. Suitable agents of this kind include inter alia metal sulfates such as $Al_2(SO_4)_3$. These substances are preferably used in quantities of from about 0.1 to 5% by weight, based on the liquid phase.

In another embodiment, it is also possible to carry out the first stage in a form that in a first step a readily filterable coarse-grained anhydrite deposit is preformed by a partial reaction carried out at a relatively low temperature and/or in a low-percentage sulfuric acid (approximately 40 to 60%). If the mixture of solids formed which, in this particular case consists of $CaF_2$ and $CaSO_4$, is then reacted in a second step, optionally following separation of the liquid phase, at an elevated temperature and/or in a more highly concentrated sulfuric acid (for example 75 to 95% by weight), it is possible, given a fast reaction, to obtain a coarse-grained readily filterable deposit and an at least 90% by weight hydrofluoric acid in the vapor phase.

The removal of hydrogen fluoride by distillation can be accelerated or achieved at lower temperatures by the application of reduced pressure to the reaction vessel. However, it is also possible to increase the hydrogen fluoride content of the solution and thus influence the reaction velocity by the appliction of excess pressure. Accordingly, this invention also relates to processes in which the installation as a whole or a part or parts thereof are operated at excess pressure or reduced pressure.

In another embodiment of the process according to the invention, the reaction may be carried out in one or more stages to give only a partial conversion, preferably from about 80 to 90%, using an excess of sulfuric acid. Following a coarse separation, for example by means of filters or a shelling centrifuge, the still moist reaction product which is introduced into a reactor, for example a moving-bed or fluidized-bed reactor, in which an after-reaction of the incompletely reacted metal fluoride with the sulfuric acid and drying of the metal sulphate are carried out simultaneously. The reaction temperature is chosen in such a way that under the conditions of pressure applied (pressures of about 0.1 to 1.0 atm. may be used) complete evaporation of the surplus sulfuric acid takes place. The temperature can range between about 50° C. and 350° C.

The combined reaction gases from the after-reaction stage and from the preceding stages are washed with concentrated $H_2SO_4$ and cooled. The condensate is delivered to the first stage whereby a considerable quantity of the heat which was used for the after-reaction and drying is recovered.

Instead of using sulfuric acid, it is also possible to use $SO_3$ depending both upon the quantity of water formed and delivered and upon $H_2SO_4$ concentration required. In this way, not only the water balance of the process is corrected but a considerable quantity of heat is introduced by the reaction of the $SO_3$ with the aqueous reaction medium.

In another preferred embodiment of the process according to the invention, substances which have highly exothermic reactions with $H_2SO_4$ or $SO_3$ which result in the formation of substances which are inert with respect to the reaction products, can be introduced, for example together with the fluorides or at any other stage of the process. In this context, "inert" means that neither are the properties of the metal sulfate formed adversely affected, nor is the hydrofluoric acid contaminated.

The addition of substances which generate heat on reaction with sulfuric acid or $SO_3$ affords considerable advantages. Under standard conditions, the reaction

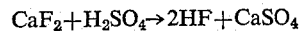

$$CaF_2 + H_2SO_4 \rightarrow 2HF + CaSO_4$$

is endothermic by 15.3 kcal./mole. In addition, a minimum temperature of around 100° C. must be maintained in order to remove the hydrofluoric acid from the reaction mixture. In practice, the quantity of heat required for this process is delivered to the reaction mixture by indirect heating. The transfer of heat to the reaction mixture is relatively poor. Since, however, the volume-time yield of a hydrofluoric acid reactor, i.e. the reaction mixture throughput, is governed by the time taken to deliver the necessary energy to the mixture, it is necesary to apply relatively high external temperatures.

The quantity of heat to be delivered to the system from outside can be reduced depending upon the quantity of the substances which are added and the amount of heat given off by each of these substances. The result of this is that the external heat which must be provided to the system can be reduced.

Alkali or alkaline earth metal oxides or hydroxides e.g. NaOH, calcium hydroxide, and the like, may be added. Calcium oxide is a preferred additive.

The substances which exact exothermically with sulfuric acid or $SO_3$ may be added in quantities which can vary within relatively wide limits in relation to the metal fluoride. Additions of up to about 20 mole percent are possible. In the case of calcium oxide, it is possible to use advantageously quantities of from about 2 to 15 mole percent, preferably from about 8 to 10 mole percent, based on the calcium fluoride content of the fluorspar. Substances of the kind which affect the setting behavior of the resulting anhydrite favorably, for example potassium compounds such as $KHSO_4$, $K_2SO_4$ and/or iron salts, such as $FeSO_4$ are preferably added during the after-reaction stage.

The invention will be further described with reference to the accompanying drawings, wherein.

Figure 2:
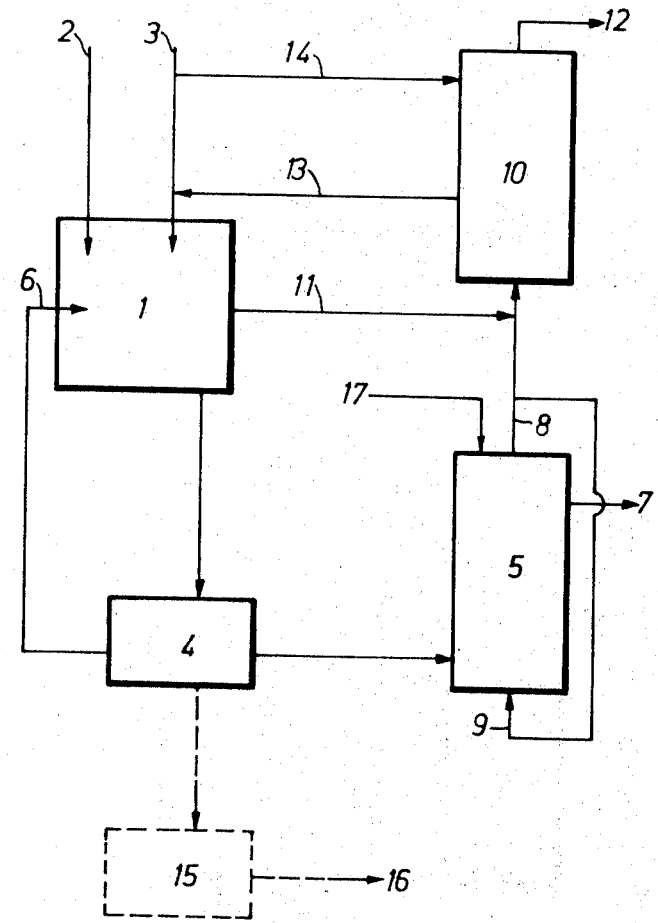
FIG. 2 is a flow sheet of one process for carrying out the invention.

Referring now more particularly to FIG. 2, the metal fluoride is reacted with $H_2SO_4$ in a reactor 1 which can be either a single-stage or a multiple-stage reactor. The metal fluorides are fed to the reactor through a feed pipe 2 and the $H_2SO_4$ through a feed pipe 3. Depending upon the way in which the reaction is controlled, the completely or partly reacted reaction product enters a separator 4 in which it is optionally incompletely separated into a solid phase and a liquid phase. The liquid phase is returned to the reactor 1 at 6 while the solid phase is delivered to an after-reactor 5. It is also possible, however, to deliver the solid phase in whole or in part to a washer 15 and then to collect the washed solid product 16.

On the solid product delivered to the after-reactor 5, an after-reaction is carried out at elevated temperature. Additives are optionally introduced through a feed pipe 17. The gaseous products, HF, $H_2SO_4$ and steam, which are given off during the after-reaction, are removed by way of the pipe 8, combined with HF issuing from the reactor 1 at 11 and then delivered to the $H_2SO_4$ washer 10. Thereafter, the HF is removed at 12 and delivered to a purification and condensation stage, while the $H_2SO_4$ is removed at 13 and is used again for reaction in the reactor 1. The gaseous products which leave the after reactor 5 at 8 may also be partly recycled, in which case they re-enter the after-reactor at 9. The solid metal sulfates are removed at 7.

Figure 3:
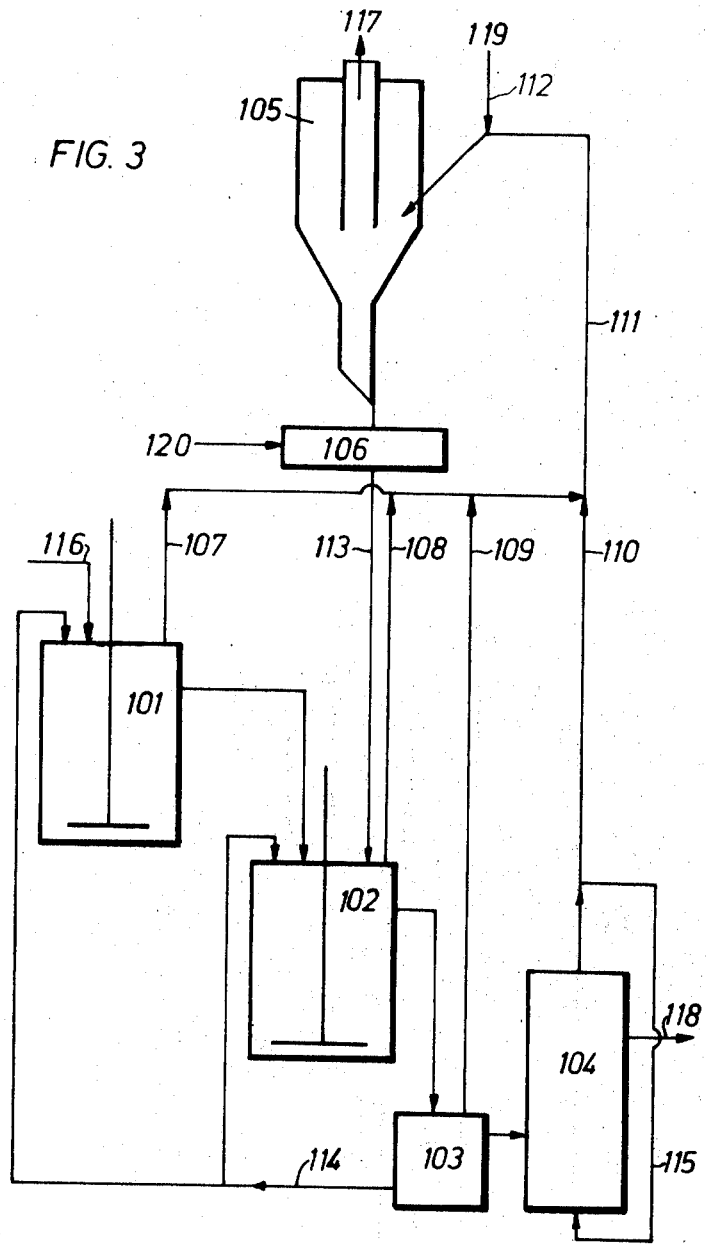
FIG. 3 is a flow sheet of an alternative process.

In another embodiment of the process shown in FIG. 3, calcium fluoride 116 is reacted initially in a preliminary stage with sulfuric acid to around 30% at temperatures of from 40 to 60° C. in a first reactor 101. The resulting suspension is transferred to a second reactor 102 in which the reaction is carried to as near completion as possible at temperatures of from 80 to 100° C. and at sulfuric acid concentrations of from 55 to 85%. The HF-containing vapors which leave the reactors 101 and 102 are delivered through pipes 107 and 108 and a collecting pipe 111 to an $H_2SO_4$-washer 105. The hydrogen fluoride leaving 117 this is worked up by purification and condensation. The suspension of largely reacted starting material which is obtained in the reactor 102 is separated in a separator 103 into a solid phase and a liquid phase in the second stage of the process. The liquid phase is returned by way of a pipe 114 to the first stage, while the solid product is subjected to an after-reaction at 104 at temperatures of from 200° C. to 300° C. in the third stage. If quantitative reaction is achieved, a dry $CaSO_4$ 118 in the form of anhydrite and an HF-containing reaction gas are obtained in this stage of the process. This gas and the gas which issues from the separation stage are delivered to the HF-washer by way of pipes 110 and 109 respectively. Some of the reaction gas may be recycled in the third stage by way of pipe 115. The necessary sulfuric acid 119 is delivered to the system by way of the washer 105 and a pipe 112. The acid is regenerated with $SO_3$ 120 in a supply vessel 106, and the reconcentrated hot acid flows into the reactor 102 by way of pipe 113. The $SO_3$ may also be introduced into the reactor 102 directly.

The invention is illustrated by the following examples.

EXAMPLE 1

1000 g. of a solution containing 85% by weight of $H_2SO_4$ (8.7 moles) and 5% by weight of HF, the remainder being water, are introduced into a corrosion proof 2.5 liter capacity vessel which is equipped with a stirring mechanism, a distillation column, a riser pipe and a thermometer. 200 g. (2.56 moles) of finely ground fluorspar (76% <0.09 mm.) are then introduced with stirring at a temperature of 100° C. The temperature is slowly raised to 140° C. Hydrogen fluoride vapors which contain a little water are delivered to the distillation column and pure hydrogen fluoride is run off at the head. The liquid which refluxes in the column comprises azeotropic hydrofluoric acid and is allowed to flow back into the reaction vessel. After 40 minutes a conversion of 97% has been achieved. The anhydrite sludge is then forced through the riser pipe into a filter centrifuge and separated from the sulfuric acid while still hot. The reaction solution is returned to the reaction vessel. 560 g. of anhydrite sludge which has a sulfuric acid content of 37% by weight accumulates and is washed with 180 g. portions of hot water in a centrifuge. The chemical reaction involves the consumption of $H_2SO_4$ and this is allowed for by the introduction of $SO_3$ into the dilute $H_2SO_4$ which is used after washing. $H_2SO_4$ is returned to the reaction vessel after being suitably concentrated by evaporation.

EXAMPLE 2

1000 g. of an aqueous solution containing 60% by weight of sulfuric acid (6.12 moles) and 3% by weight of HF, are introduced into a reaction vessel of the kind described in Example 1. 250 g. of finely ground fluorspar (3.2 moles) are then introduced at a temperature of 120° C. The reaction begins vigorously and is accompanied by foaming of the solution. After 45 minutes a conversion of 96% has been reached. The coarse-grained anhydrite sludge is separated from the reaction solution by a corrosion-proof pressure filter. The hydrogen fluoride vapors which contain 42% by weight of HF are condensed in a corrosion-proof condenser.

EXAMPLE 3

40 g. of finely ground fluorspar (0.51 moles) are added to 2000 g. of 30% by weight sulfuric acid (6.12 moles) at 50° C. in a 2.5 liter capacity vessel of the kind used in Examples 1 and 2 equipped with stirring mechanism. After 70 minutes, a conversion of 95% has been reached. Calcium sulfate accumulates in the form of a needle-shaped calcium sulfate dihydrate which is easy to filter off. Hydrofluoric acid is recovered from the reaction solution by distillation.

EXAMPLE 4

80 g. (1.0 moles) of finely ground fluorspar are added to 1500 g. of 30% sulfuric acid (4.6 moles) at 105° C. in an apparatus of the kind used in Examples 1 to 3 equipped with stirring mechanism. 97% of the fluorspar have reacted after 60 minutes. The hydrogen fluoride containing vapors are removed and fractionated in a known manner. Calcium sulfate semihydrate is formed by the reaction and is filtered off, washed with boiling water and dried.

EXAMPLE 5

1000 g. of a solution comprising 50% by weight of $H_2SO_4$ (5.1 moles) 3% by weight of HF and 47% by weight of $H_2O$ are introduced into a reaction vessel of the kind used in Examples 1 to 4. 100 g. of finely ground fluorspar (1.28 moles) are then introduced at a reaction temperature of 120° C. After 3 minutes the solid phase is filtered off, a conversion of 27% having been reached. This preliminary reaction product, which still contains 22% by weight of dilute sulfuric acid, is then reacted with 1000 g. of an aqueous solution containing 85% by weight of $H_2SO_4$ (8.7 moles), 5% by weight of HF, in a second similar reactor at 130° C. The reaction begins vigorously. After 30 minutes, a conversion of 98% has been reached and the reaction is complete. Anhydrite is precipitated in very coarse-grained form and can readily be filtered off while hot. The vapors which issue from the second reaction vessel have a hydrogen fluoride concentration of 90%. They are partly condensed in the rectification column, azeotropic hydrofluoric acid being allowed to flow back into the reaction vessel. Pure hydrogen fluoride is removed from the head of the column.

EXAMPLE 6

As described in Example 5, a reaction of 100 g. of finely ground fluorspar with 1000 g. of a 50% by weight $H_2SO_4$ solution is allowed to proceed for 3 minutes at 120° C. up to a conversion of around 25% in the first step of the first stage. After the mixture has been filtered the reaction is continued in a second stage with 1000 g. of an 85% by weight $H_2SO_4$ solution for 20 minutes at 130° C. to a conversion of only 85%. After this mixture has been repeatedly filtered, the liquid adhering to the moist reaction product is removed at 300° C. and the reaction simultaneously completed by carrying the conversion to 98%. A dry end product is obtained.

EXAMPLE 7

100 g. of finely ground fluorspar (1.28 moles) are mixed with 1500 g. of a 30% by weight sulfuric acid (4.6 moles), which contains 0.5% by weight of aluminum sulfate as agent to influence the form of the crystals, in a vessel equipped with stirring mechanism (cf. Examples 1 to 5) at 105° C. After 75 minutes, 95% of the fluorspar has reacted. The hydrogen fluoride-containing vapors are removed and fractionated in a known manner. Coarsely crystalline calcium sulfate semi-hydrate is formed by the reaction and is filtered off, washed with boiling water and dried.

It will be appreciated that the instant specification and examples are set forth by way of illustration and not limitation and that various modifications and changes may be made without departing from the spirit and scope of the present invention.

What is claimed is:

1. In the production of hydrogen fluoride and a metal sulfate by the reaction of a metal fluoride with sulfuric acid in an aqueous suspension at an elevated temperature up to about 350° C., the improvement which comprises
   (a) in a first stage contacting the metal fluoride with about 2 to 11 times the stoichiometric amount of about 20 to 100% sulfuric acid at an elevated temperature up to about 300° C., and separating hydrogen fluoride formed, and
   (b) passing the reaction mass to a second stage, separating the liquid phase in said second stage, and recycling the liquid to said first stage.

2. The process of claim 1 including the further step of heating the solid residue from said second stage in a third stage at a temperature of about 50 to 350° C.

3. The process of claim 2, in which only a part of the fluoride is reacted in the first stage and the remainder is decomposed in the third stage.

4. The process of claim 1 in which the first stage is carried out in two or more sub-stages, differing from one another in at least one of concentration and temperature.

5. The process of claim 1 in which the metal fluoride is calcium fluoride.

6. The process of claim 1 in which the metal fluoride is preheated to a temperature of about 50 to 800° C.

7. The process of claim 1 in which the sulfuric acid delivered to the process is preheated to a temperature of about 50 to 300° C.

8. The process of claim 1, in which the sulfuric acid required for the reaction is at least in part formed in situ by supplying sulfur trioxide which reacts with water in the suspension, the heat of reaction of the sulfur trioxide and water at least in part supplying the heat required for the reaction of the sulfuric acid and metal fluoride.

Figure 1:
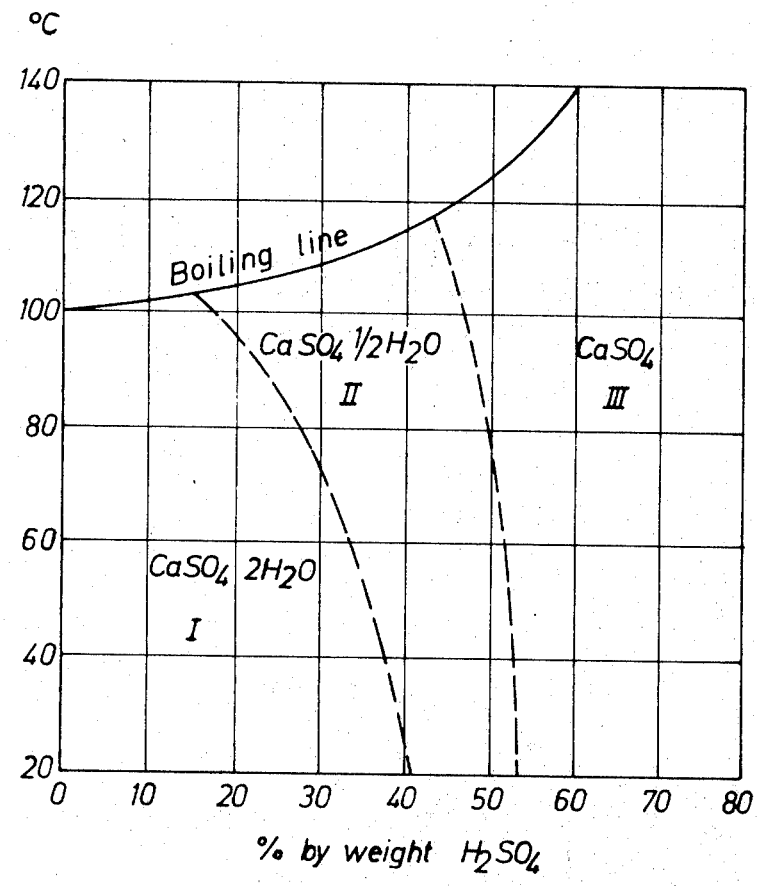
FIG. 1 is a plot of sulfuric acid concentration versus temperature showing the state of hydration of the calcium sulfate which will result from reaction of fluorspar with sulfuric acid.

9. The process of claim 1, in which the reaction conditions are chosen according to FIG. 1 so that calcium sulfate dihydrate is formed by the reaction.

10. The process of claim 1, in which the reaction conditions are chosen according to FIG. 1 so that calcium sulfate semi-hydrate is formed by the reaction.

11. The process of claim 1 in which the reaction conditions are chosen according to FIG. 1 so that anhydrite is formed by the reaction.

12. The process of claim 1 in which there is added to the reaction mass an alkali or alkaline earth metal oxide or hydroxide, potassium sulfate or iron sulfate, thereby to supply heat to the reaction, and/or to modify the shape and size of the metal sulfate formed by the primary reaction.

13. The process of claim 1 in which there is added to the reaction mass an alkali or alkaline earth metal oxide or hydroxide which produces heat through reaction with sulfuric acid.

References Cited

UNITED STATES PATENTS

| | | | |
|---|---|---|---|
| 2,151,339 | 3/1939 | Sullivan | 423—555 |
| 2,197,953 | 4/1940 | Sullivan | 423—555 |
| 2,222,385 | 11/1940 | Washburn et al. | 423—555 |
| 2,655,430 | 10/1953 | Schiermeier | 423—555 |
| 2,937,926 | 5/1960 | Hanusch | 423—555 X |
| 3,102,787 | 9/1963 | McMillan et al. | 423—485 |
| 3,160,473 | 12/1964 | Hayworth et al. | 423—485 |
| 3,278,265 | 10/1966 | Quarles | 423—485 |
| 3,377,020 | 4/1968 | Piper | 423—555 X |
| 3,469,939 | 9/1969 | Aiso | 423—485 |
| 3,718,736 | 2/1973 | Watson et al. | 423—555 |

EDWARD STERN, Primary Examiner

U.S. Cl. X.R.

423—483, 555